US012348922B2

(12) United States Patent
Mihara et al.

(10) Patent No.: US 12,348,922 B2
(45) **Date of Patent: *Jul. 1, 2025**

(54) SOUND OUTPUT DEVICE

(71) Applicant: ambie Corporation, Tokyo (JP)

(72) Inventors: Ryota Mihara, Tokyo (JP); Yasuhide Hosoda, Kanagawa (JP)

(73) Assignee: AMBIE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/144,742

(22) Filed: May 8, 2023

(65) Prior Publication Data

US 2023/0276156 A1 Aug. 31, 2023

Related U.S. Application Data

(63) Continuation of application No. 16/478,013, filed as application No. PCT/JP2017/044762 on Dec. 13, 2017, now Pat. No. 11,683,626.

(30) Foreign Application Priority Data

Jan. 27, 2017 (JP) ................................ 2017-013706

(51) Int. Cl.
*H04R 1/10* (2006.01)
*H04R 1/02* (2006.01)

(52) U.S. Cl.
CPC ................. *H04R 1/10* (2013.01); *H04R 1/02* (2013.01)

(58) Field of Classification Search
CPC .......... H04R 1/10; H04R 1/02; H04R 1/1075; H04R 1/1066; H04R 1/105; H04R 5/0335
See application file for complete search history.

(56) References Cited

U.S. PATENT DOCUMENTS

| | | | |
|---|---|---|---|
| 4,742,887 | A | 5/1988 | Yamagishi |
| 5,459,290 | A | 10/1995 | Yamagishi |
| 6,681,022 | B1 | 1/2004 | Puthuff et al. |
| 11,683,626 | B2 | 6/2023 | Mihara et al. |
| 2002/0012440 | A1 | 1/2002 | Hashimoto et al. |

(Continued)

FOREIGN PATENT DOCUMENTS

| | | |
|---|---|---|
| CN | 104661134 | 5/2015 |
| EP | 3509319 | 7/2019 |

(Continued)

OTHER PUBLICATIONS

Machine translation of JP2013115799, 10 pages (Year: 2013).*

(Continued)

*Primary Examiner* — Ping Lee
(74) *Attorney, Agent, or Firm* — Sheridan Ross PC

(57) ABSTRACT

The present technology is to improve usability. Provided is an attachment portion which includes a first pressing portion and a second pressing portion to be pressed against both surfaces of an auricle respectively and is attached to an ear in a state of sandwiching the auricle. A pair of the attachment portions is provided, and the pair of attachment portions can be engaged with each other. With this structure, the pair of attachment portions can be engaged with each other when not in use and the like, entanglement between cords or between the cords and the attachment portions can be prevented, and usability can be improved.

10 Claims, 11 Drawing Sheets

(56) References Cited

U.S. PATENT DOCUMENTS

| | | | | |
|---|---|---|---|---|
| 2006/0013429 | A1 | 1/2006 | Ohta | |
| 2009/0123000 | A1 * | 5/2009 | Wright | H04R 5/02 381/381 |
| 2011/0007926 | A1 * | 1/2011 | Murozaki | H04R 1/105 381/374 |
| 2011/0164778 | A1 * | 7/2011 | Wengreen | H04R 1/1066 381/381 |
| 2012/0243723 | A1 | 9/2012 | Halkosaari et al. | |
| 2013/0216087 | A1 | 8/2013 | MacDonald | |
| 2016/0037249 | A1 | 2/2016 | Kumar | |
| 2018/0324513 | A1 | 11/2018 | Igarashi et al. | |

FOREIGN PATENT DOCUMENTS

| | | |
|---|---|---|
| JP | H05-088086 | 11/1993 |
| JP | 2002-010385 | 1/2002 |
| JP | 2005-064909 | 3/2005 |
| JP | 2006-148186 | 6/2006 |
| JP | 2006-270907 | 10/2006 |
| JP | 2011-019124 | 1/2011 |
| JP | 2013-115799 | 6/2013 |
| WO | WO 2016/067700 | 5/2016 |

OTHER PUBLICATIONS

Machine translation of JP2006270907, 2 pages (Year: 2006).*

Official Action (with English Translation) for Japan Patent Application No. 2018-564150, dated Sep. 19, 2023, 4 pages.

Official Action (with English translation) for Brazil Patent Application No. BR112019014899-0, Jun. 5, 2023, 8 pages.

International Search Report and Written Opinion for International (PCT) Patent Application No. PCT/JP2017/044762, dated Mar. 6, 2018, 6 pages.

Extended European Search Report for European Patent Application No. 17894266.0, dated Jan. 23, 2020, 8 pages.

Official Action (with English translation) for China Patent Application No. 201780084034.5, dated Jun. 23, 2020, 15 pages.

Official Action (with English Translation) for Japan Patent Application No. 2018-564150, dated Jan. 17, 2023, 8 pages.

Official Action for U.S. Appl. No. 16/478,013, dated Jul. 2, 2020, 11 pages.

Official Action for U.S. Appl. No. 16/478,013, dated Dec. 10, 2020, 12 pages.

Official Action for U.S. Appl. No. 16/478,013, dated Jun. 3, 2021, 13 pages.

Official Action for U.S. Appl. No. 16/478,013, dated Oct. 28, 2021, 15 pages.

Official Action for U.S. Appl. No. 16/478,013, dated Mar. 22, 2022, 15 pages.

Official Action for U.S. Appl. No. 16/478,013, dated Sep. 23, 2022, 20 pages.

Notice of Allowance for U.S. Appl. No. 16/478,013, dated Feb. 10, 2023, 8 pages.

Corrected Notice of Allowance for U.S. Appl. No. 16/478,013, dated Apr. 14, 2023, 5 pages.

Official Action (with English translation) for Brazil Patent Application No. BR112019014899-0, dated Dec. 30, 2024, 6 pages.

Official Action (with English translation) for Japan Patent Application No. 2023-081853, dated Jul. 30, 2024, 8 pages.

* cited by examiner

SOUND OUTPUT DEVICE

CROSS REFERENCE TO RELATED APPLICATIONS

This application is a continuation of U.S. patent application Ser. No. 16/478,013 filed Jul. 15, 2019, which is a national stage application under 35 U.S.C. 371 and claims the benefit of PCT Application No. PCT/JP2017/044762 having an international filing date of Dec. 13, 2017, which designated the United States, which PCT application claimed the benefit of Japanese Patent Application No. 2017-013706 filed Jan. 27, 2017, the entire disclosures of each of which are incorporated herein by reference.

TECHNICAL FIELD

The present technology relates to a technical field regarding a sound output device used in a state attached to an ear.

BACKGROUND ART

There is a sound output device that is attached to an ear and used as a headphone or an earphone and outputs a sound from a speaker.

In recent years, the sound output device is increasingly used not only indoors but also outdoors. Therefore, it is desired that convenience such as improvement in portability is secured in the sound output device, in addition to securing excellent sound output.

When not in use, the above-described sound output device is often carried around by being stored in a bag, a pocket, or the like in a state of being detached from an ear, and recently a small type has been developed (for example, see Patent Document 1).

In a sound output device disclosed in Patent Document 1, a housing includes an insertion portion and a transmission member, an electro-acoustic transducer and a vibrator are arranged inside the transmission member as a driver for sound output, and a plug that is movable inside and outside the insertion portion is provided. The insertion portion is formed with a through hole that enables an external sound to be heard.

In this sound output device, a part of the insertion portion is inserted into an external auditory meatus, and the transmission member is attached to the ear in a state in which the transmission member contacts a tragus and an anti-tragus on a front side of the insertion portion. A sound is recognized in such a manner in that vibration generated in the electro-acoustic transducer is transmitted from the vibrator to the transmission member and the transmitted vibration is transmitted from an ear bone to a brain through a skull and the like. An external sound is vibrated into a space between the plug and an eardrum and transmitted to a user, and external sound can be differently heard by moving the plug at this time.

CITATION LIST

Patent Document

Patent Document 1: Japanese Patent Application Laid-Open No. 2014-96739

SUMMARY OF THE INVENTION

Problems to be Solved by the Invention

By the way, there are many cases where such an above-described sound output device receives input/output of electric signals such as sound signals through a cord, but in a type of the sound output device having the cord connected like this, when a portion to be attached to an ear is tangled with the cord while carrying around the sound output device, usability may be deteriorated due to a situation in which, for example, the sound output device cannot be quickly attached.

Accordingly, the sound output device of the present technology is directed to overcoming the above-described problem and improving the usability.

Solutions to Problems

First, the sound output device according to the present technology includes an attachment portion which includes a first pressing portion and a second pressing portion to be pressed against both surfaces of an auricle respectively and is attached to an ear in a state of sandwiching the auricle, and a pair of the attachment portions is provided, and the pair of attachment portions can be engaged with each other.

With this structure, the pair of attachment portions can be engaged with each other when not in use and the like.

Second, in the above-described sound output device, it is preferable that the attachment portion be formed in a bent shape in such a manner that a longitudinal direction becomes a peripheral direction, a gap be formed between both of ends in the longitudinal direction, and the attachment portion be elastically deformable in directions in which both of end portions in the longitudinal direction are separated from each other and contact each other.

With this structure, the attachment portion is elastically deformed at the time of attachment to and detachment from the ear.

Third, in the above-described sound output device, it is preferable that the first pressing portion and the second pressing portion be provided at both of the end portions of the attachment portion, respectively.

With this structure, both of the end portions of the attachment portion are pressed against both of the surfaces of the auricle, respectively.

Fourth, in the above-mentioned sound output device, it is preferable that a portion other than both of the end portions of the attachment portion be provided as an intermediate portion, and a distance between a pair of ends in the longitudinal direction be formed shorter than a maximum distance out of distances each connecting two points in an inner periphery of the intermediate portion.

With this structure, the intermediate portion hardly contacts the auricle in a state in which the sound output device is attached to the ear.

Fifth, in the sound output device described above, it is preferable that a surface of each of the first pressing portion and the second pressing portion be formed in a curved surface projecting outward.

With this structure, an excessive load to the auricle from the sound output device is not applied.

Sixth, in the above-mentioned sound output device, it is preferable that a portion other than both of the end portions in the attachment portion be provided as the intermediate portion, and a maximum thickness of one end portion in the longitudinal direction and a maximum thickness of the other end portion in the longitudinal direction be formed thicker than a maximum thickness of the intermediate portion.

With this structure, in a state in which the attachment portions are engaged with each other, both of the end portions can be positioned in a state of being inserted into an inner side of the intermediate portion.

Seventh, in the sound output device described above, it is preferable that the attachment portion be formed by connecting a plurality of members, and the attachment portion have an outer surface closely covered with a cover.

With this structure, since the attachment portion is covered by the cover from the outside, even when there is a clearance generated between the plurality of members, the clearance is blocked by the cover.

Eighth, in the sound output device described above, it is preferable that the outer surface of the attachment portion be formed in a curved surface.

With this structure, the sound output device is attached to the ear in a state in which the curved surface is pressed.

Effects of the Invention

According to the present technology, the pair of the attachment portions can be engaged with each other when not in use and the like, entanglement between cords or between the cords and the attachment portions can be prevented, and usability can be improved.

Note that the effects described in the present specification are merely examples and not limited thereto, and additional effects may be provided as well.

MODE FOR CARRYING OUT THE INVENTION

In the following, a mode for carrying out a sound output device of the present technology will be described with reference to the attached drawings.

In an embodiment described below, the sound output device of the present technology is applied to an earphone. However, an application scope of the present technology is not limited to the earphone, and the present technology can be widely applied to various kinds of other sound output devices such as headphones.

<Structure of Ear>

Figure 1:
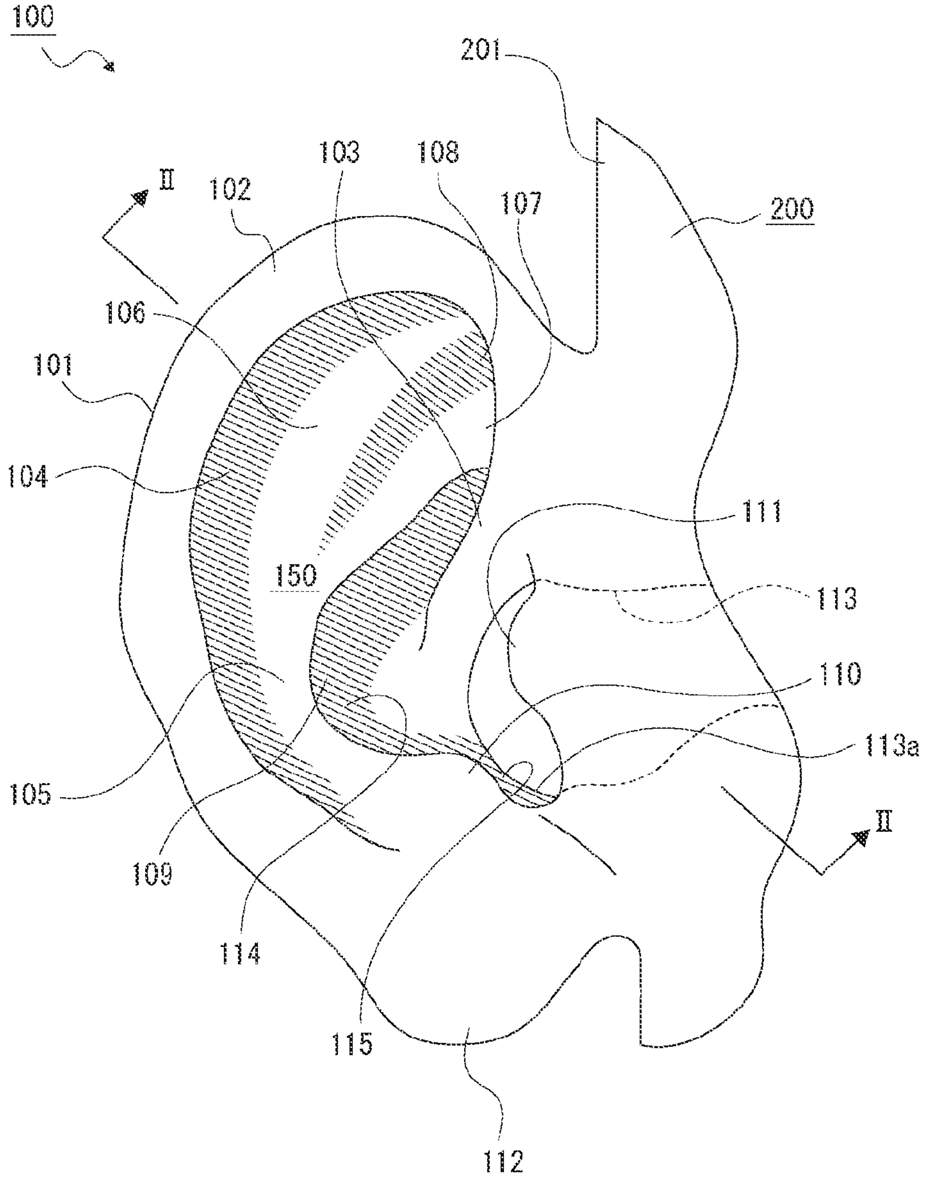
FIG. 1 illustrates an embodiment of a sound output device of the present technology together with FIGS. 2 to 12, and the drawing is a perspective view of an ear to which the sound output device is attached.
Figure 2:
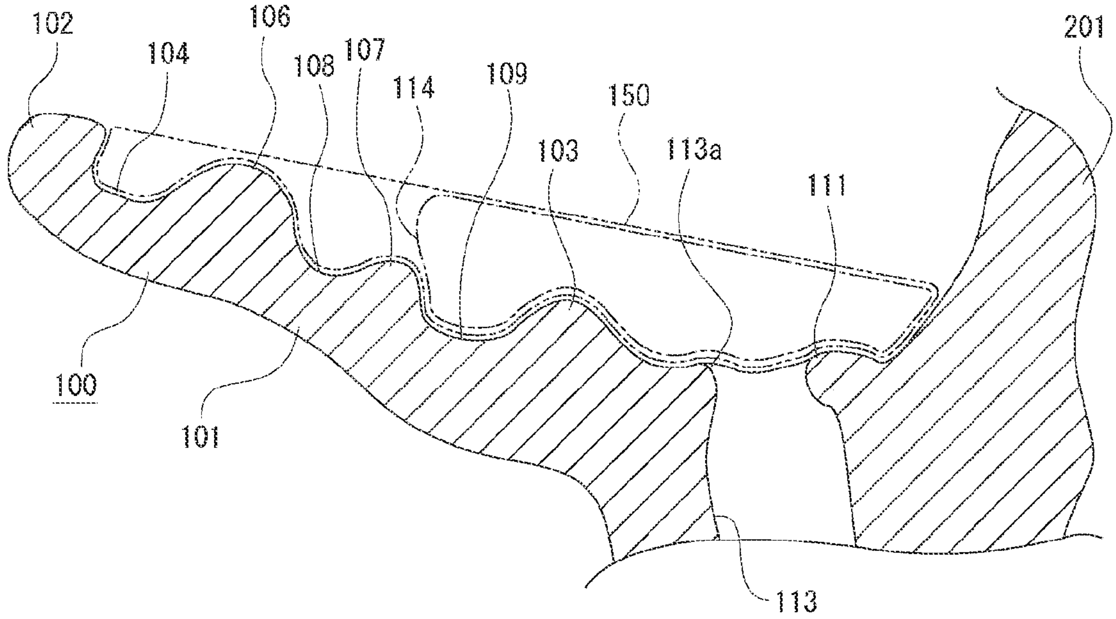
FIG. 2 is a cross-sectional view taken along a line II-II in FIG. 1.

First, a structure of an ear to which the sound output device is attached will be described (see FIGS. 1 and 2).

Ears 100 and 100 constitute a part of a head 200 and, each ear includes an auricle 101 and respective portions such as an eardrum membrane, a semicircular canal, and a cochlea which exist inside the head 200. In the head 200, portions on inner insides of the respective auricles 101 are temporal regions 201 and 201, and the auricle 101 protrudes to a left side or a right side from the temporal regions 201 and 201.

Each auricle 101 has a shallow recessed shape opened in a substantially forward direction as a whole so as to have an internal space 150, and an outer peripheral portion thereof includes a portion called a "helix 102" and a portion called a "crus of helix 103" which is continued to the helix 102 and positioned in the vicinity of the temporal region 201.

An inner portion of the helix 102 is called a "scaphoid fossa 104" having a recessed shape, and a substantially lower half portion on an inner side of the scaphoid fossa 104 is called an "antihelix 105" having a projecting shape. There is a portion continued to the antihelix 105 and having a bifurcating and projecting shape above the antihelix 105, and a portion on an outer side and a portion on an inner side of the bifurcating portion are called a "superior crus of antihelix 106" and an "inferior crus of antihelix 107", respectively. A portion between the superior crus of antihelix 106 and the inferior crus of antihelix 107 is called a "triangular fossa 108" having a recessed shape, and a portion on an inner side of the antihelix 105 and the inferior crus of antihelix 107 is called a "cymba conchae 109" having a recessed shape.

A portion continued to a lower side of the antihelix 105 slightly bulges to the temporal region 201 side and is a portion called an "anti-tragus 110". A portion facing the anti-tragus 110 and located on the temporal region 201 side is called a "tragus 111" that slightly bulges to the anti-tragus 110 side, and a lower end portion continued to a lower side of the helix 102 is called an "earlobe 112".

There is an external acoustic aperture 113*a* functioning as an entrance of an external auditory meatus 113 in a portion between the anti-tragus 110 and the tragus 111, and the external auditory meatus 113 communicates with the eardrum membrane, the semicircular canal, and the like. In the internal space 150 of the auricle 101, a space surrounded by the antihelix 105, the inferior crus of antihelix 107, and the crus of helix 103, in other words, a space on a front side of the cymba conchae 109 is called a "cavum conchae 114" and communicates with the external acoustic aperture 113*a* of the external auditory meatus 113. In the internal space 150, a space that is continued to a lower side of the cavum conchae 114 and opened in a U shape is a space called an "intertragic notch 115".

The internal space 150 of the auricle 101 includes the cavum conchae 114, the intertragic notch 115, and a space in the vicinity of the external acoustic aperture 113*a* of the external auditory meatus 113, and also is a space including the scaphoid fossa 104, the antihelix 105, the superior crus of antihelix 106, the inferior crus of antihelix 107, the triangular fossa 108, the anti-tragus 110, and a space on a front side of the tragus 111.

<Schematic Configuration of Sound Output Device>

Next, a configuration of the sound output devices 1 and 1 will be described (see FIGS. 3 to 6). In the sound output devices 1 and 1, one is used for a left ear 100 and the other one is used for a right ear 100. But, a sound may also be heard by using either one of the sound output devices 1.

The sound output device 1 includes an attachment portion 2 and a speaker 3.

The attachment portion 2 is formed by connecting a housing 4, a detachable body 5, and a connection member 6.

The attachment portion 2 is formed in a bent shape in such a manner that a longitudinal direction becomes a peripheral direction and is formed in a shape extending in the peripheral direction as a whole. The attachment portion 2 has an outer surface formed in a curved surface projecting outward. The attachment portion 2 has one end portion in the longitudinal direction provided as a speaker arrangement portion 7, the other end portion in the longitudinal direction provided as a sound output unit 8, and a portion between the speaker arrangement portion 7 and the sound output unit 8 provided as an intermediate portion 9.

The housing 4 includes, for example, a resin material, a part thereof functions as the speaker arrangement portion 7, and the remaining part thereof functions as the intermediate portion 9. The housing 4 is formed by connecting a first member 10 and a second member 11 (see FIGS. 4 to 6). The first member 10 and the second member 11 constitute the housing 4 by being connected in a direction orthogonal to the longitudinal direction.

The first member 10 includes: a base portion 12 formed in a substantially arc shape; an arrangement portion 13 continued to one end in the longitudinal direction of the base portion 12; and a coupling portion 14 continued to the other end in the longitudinal direction of the base portion 12. The base portion 12 has a groove portion 12*a* formed in a manner extending in the longitudinal direction. The arrangement portion 13 has an arrangement recess 13*a* formed in a manner continued to the groove portion 12*a*. The coupling portion 14 is formed in a cylindrical shape and has an inner space formed as a sound hole 14*a* continued to the groove portion 12*a*.

A shallow mounting recess 13*b* is formed on an outer surface side of the arrangement portion 13. In the arrangement portion 13, a cord insertion hole 13*c* communicating with the mounting recess 13*b* and the arrangement recess 13*a* is formed.

The second member 11 includes: a base portion 15 formed in a substantially arc shape; and an arrangement portion 16 continued to one end in the longitudinal direction of the base portion 15. The base portion 15 has a groove portion 15*a* formed in a manner extending in the longitudinal direction. The arrangement portion 16 has an arrangement recess 16*a* formed in a manner continued to the groove portion 15*a*.

The first member 10 and the second member 11 have the base portion 12 and the base portion 15 connected to each other and also have the arrangement portion 13 and the arrangement portion 16 connected to each other by, for example, bonding. In the state in which the first member 10 and the second member 11 are connected, a sound guiding space 17 is formed by the groove portion 12*a* and the groove portion 15*a*, and an arrangement space 18 is formed by the arrangement recess 13*a* and the arrangement recess 16*a*.

In a state in which the first member 10 and the second member 11 are connected to constitute the housing 4, the speaker 3 is arranged in the arrangement space 18. As the speaker 3, a dynamic driver unit is used, for example. Note that a battery to supply power to the speaker 3, a control board to control the speaker 3, and the like may be arranged in the arrangement space 18, in addition to the speaker 3.

Figure 6:
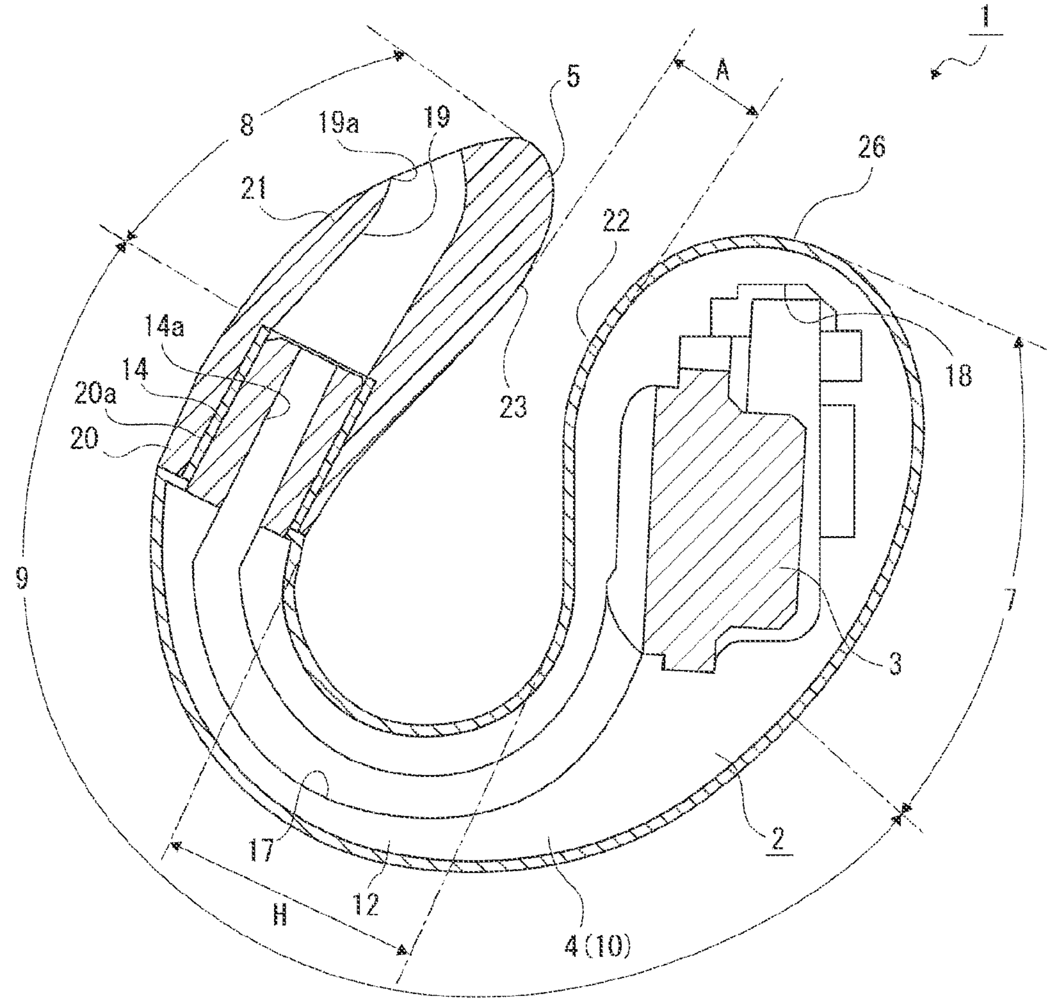
FIG. 6 is a cross-sectional view of the sound output device.

The detachable body 5 includes, for example, silicon or a rubber material, and a sound hole 19 is formed inside thereof (see FIG. 6). One end of the sound hole 19 is formed as an opening 19*a* for sound output. In the detachable body 5, a direction in which the sound hole 19 extends is set as a longitudinal direction, an approximately half portion in the longitudinal direction is provided as a coupled portion 20, and an approximately remaining half portion is provided as a distal end portion 21. The coupled portion 20 functions as a part of the intermediate portion 9, and the distal end portion 21 functions as the sound output unit 8.

The detachable body 5 has an inner peripheral portion of the coupled portion 20 provided as an outer fitting portion 20*a*, and has the outer fitting portion 20*a* formed from a material having hardness harder than that of the remaining part of the detachable body 5. The detachable body 5 is detachably attached to the housing 4, and is attached to the housing 4 by the outer fitting portion 20*a* being externally fitted with the coupling portion 14.

The attachment portion 2 is formed in a state in which the speaker arrangement portion 7 of the housing 4 and the distal end portion 21 of the detachable body 5 face each other, a portion of the speaker arrangement portion 7 facing the distal end portion 21 is provided as a first pressing portion 22, a portion of the distal end portion 21 facing the speaker arrangement portion 7 is provided as a second pressing portion 23, and a gap A is formed between the first pressing portion 22 and the second pressing portion 23. The first pressing portion 22 and the second pressing portion 23 are the portions to be pressed against both surfaces of the auricle 101 respectively in a state in which the sound output device 1 is attached to the ear 100. The surfaces of the first pressing portion 22 and the second pressing portion 23 are formed in a gently curved surface projecting outward.

Additionally, a portion of the attachment portion 2 other than both end portions in the longitudinal direction is provided as the intermediate portion 9, and a distance A between a pair of ends in the longitudinal direction is formed shorter than a maximum distance H out of distances each connecting two points in an inner periphery of the intermediate portion 9.

The attachment portion 2 is elastically deformable in a direction in which the first pressing portion 22 and the second pressing portion 23 are separated from each other and contact each other.

Figure 3:
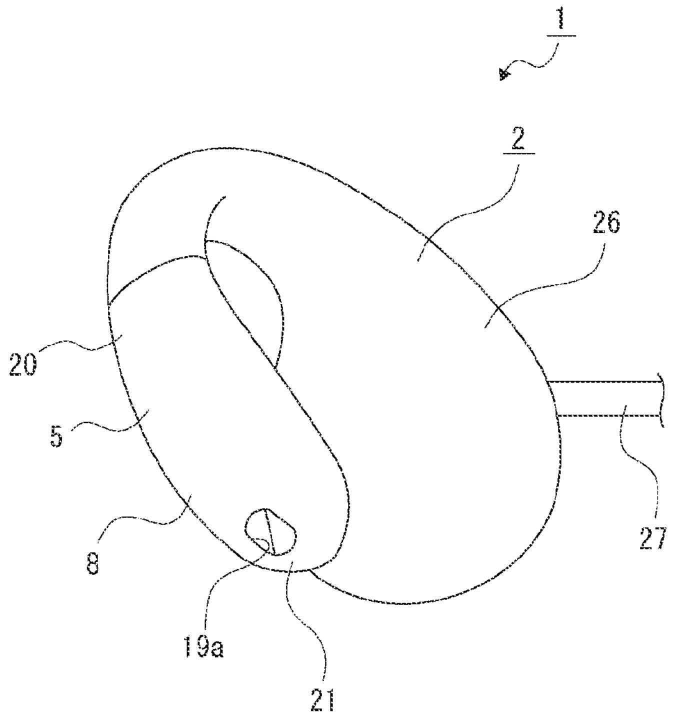
FIG. 3 is a perspective view of the sound output device.
Figure 4:
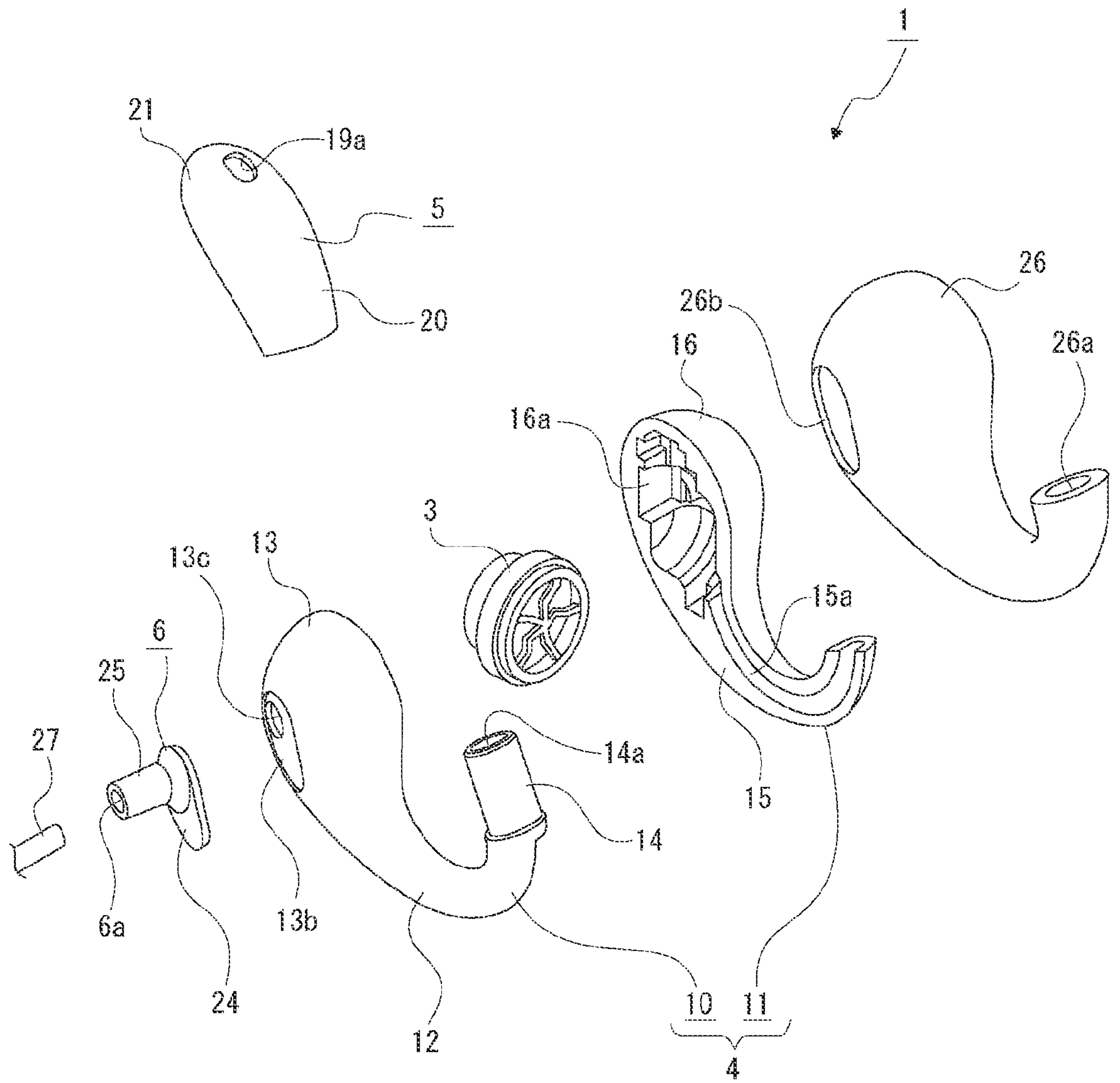
FIG. 4 is an exploded perspective view of the sound output device.
Figure 5:
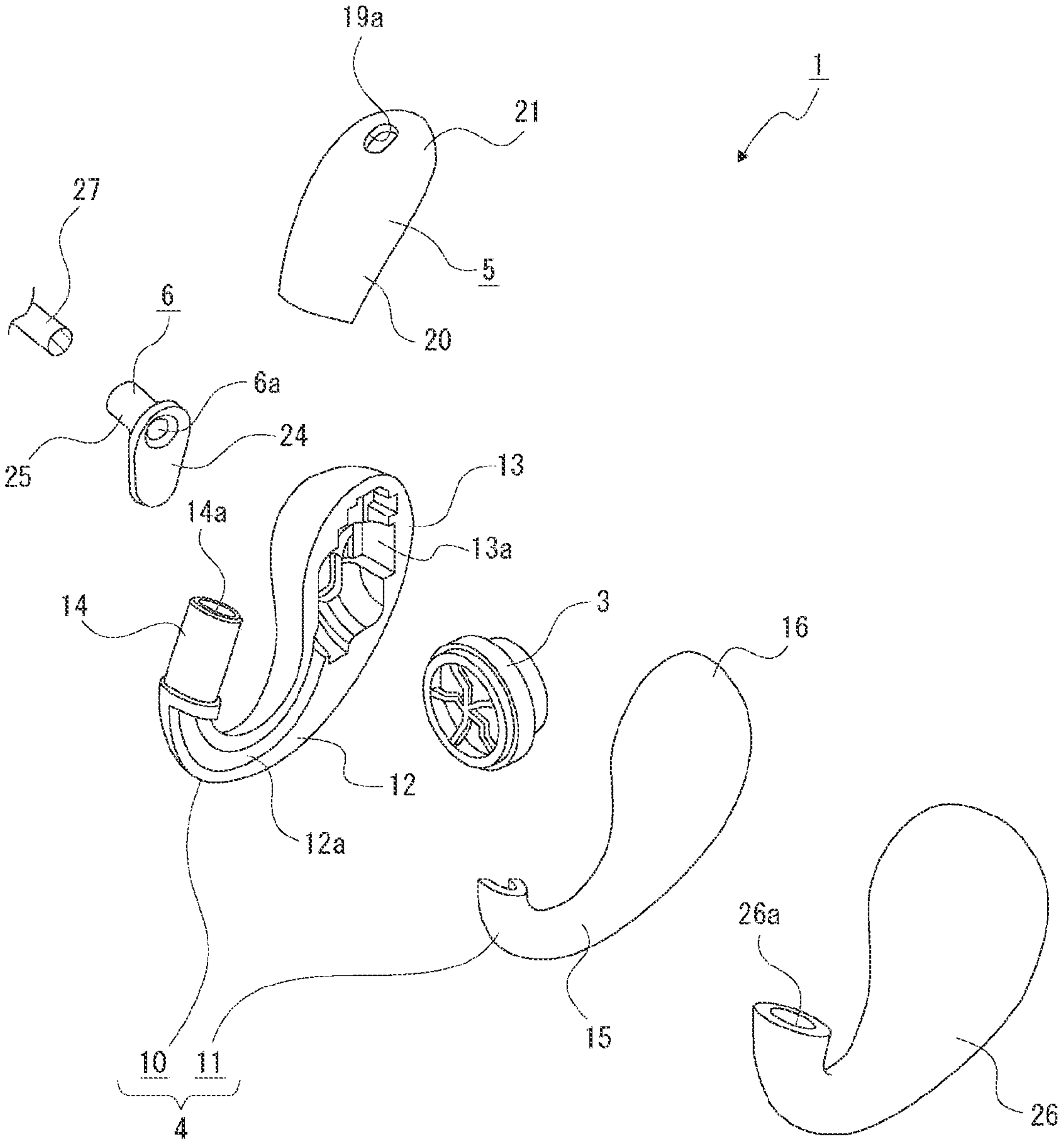
FIG. 5 is an exploded perspective view illustrating the sound output device when viewed in a direction different from that in FIG. 4.

The connection member 6 includes: a plate portion to be mounted 24; and a cord passage portion 25 protruding from the plate portion to be mounted 24 (see FIGS. 3 to 5). In the connection member 6, a cord passage hole 6*a* passing through a range between the cord passage portion 25 and the plate portion to be mounted 24 is formed. The connection member 6 is mounted on the housing 4 by bonding or the like in a state in which the plate portion to be mounted 24 is inserted into the mounting recess 13*b*. In the state in which the connection member 6 is mounted on the housing 4, the cord passage hole 6*a* is in communication with the cord insertion hole 13*c*.

A portion of the housing 4 excluding the coupling portion 14 is covered by a cover 26, and the cover 26 is made to closely contact an outer surface of the housing 4. The cover 26 includes an elastically deformable silicon or a rubber material, and is formed in a bag-like shape with a reduced thickness. An opening portion 26*a* is formed in one end surface of the cover 26. An arrangement hole 26*b* is formed in the cover 26.

In a state in which the housing 4 is covered with the cover 26, the cover 26 is made to closely contact the outer surface of the housing 4, the opening portion 26*a* is positioned at a boundary between the coupling portion 14 and the base portion 12, and the connection member 6 is brought into a state of being arranged in the arrangement hole 26*b*. Accordingly, the housing 4 has the coupling portion 14 protruding from the opening portion 26*a*, and the connection member 6 has the cord passage portion 25 brought into a state of protruding from the arrangement hole 26*b*.

As described above, the attachment portion 2 is formed by connecting the plurality of members including at least the first member 10 and the second member 11, and has the outer surface closely covered with the cover 26.

Therefore, since the attachment portion 2 is covered with the cover 26 from the outside, even when a clearance is generated between the first member 10 and the second member 11, the clearance is blocked by the cover 26 and leakage of a sound output from the speaker 3 can be prevented.

Additionally, since the first member 10 and the second member 11 are connected by bonding, there may be a possibility that a bonding agent may come out to the outer surface side of the housing 4, but even in a case where the bonding agent comes out, the bonding agent that has come out is blocked by the cover 26, and there is no need to form, in the housing 4, a structure to prevent the bonding agent from coming out, and a manufacturing cost can be reduced and workability in bonding work can be improved.

Additionally, as an exemplary means to prevent the bonding agent from coming out, there is a means to form, in a thickness range of the housing 4, a standing wall, a groove, or the like to prevent leakage of the bond adhesive, however; since the cover 26 is provided, there is no need to form such a standing wall, groove, or the like, and the thickness of the housing 4 can be made thin accordingly. Therefore, the space to guide a sound, which is formed inside the housing 4, can have an increased diameter, and an excellent output state of the sound can be secured.

A cord 27 is inserted into the cord passage hole 6*a* of the connection member 6 and the cord insertion hole 13*c* of the housing 4, and one end portion of the cord 27 is connected to the control board or the speaker 3. For example, a remote-control device (not illustrated) is connected to an intermediate portion of the cord 27, and it is possible to change a type or a volume of the sound output from the speaker 3 by operating the remote-control device.

Note that both of the cord 27 led from the sound output device 1 for the left ear 100 and the cord 27 led from the sound output device 1 for the right ear 100 have the intermediate portions connected to the same remote-control device.

The cord 27 has the other end portion connected to an external apparatus (not illustrated) such as a music player used as a sound source of a sound (sound signal). Therefore, the sound signal output from the external apparatus is transmitted to the speaker 3 through the cord 27, and the sound is output from the speaker 3. Additionally, power is supplied from the external apparatus to the speaker 3 through the cord 27, and the speaker 3 can be driven.

<Attachment State of Sound Output Device to Ear>

Hereinafter, an attachment state of the sound output device 1 to the ear 100 will be described (see FIGS. 7 to 10).

Figure 7:
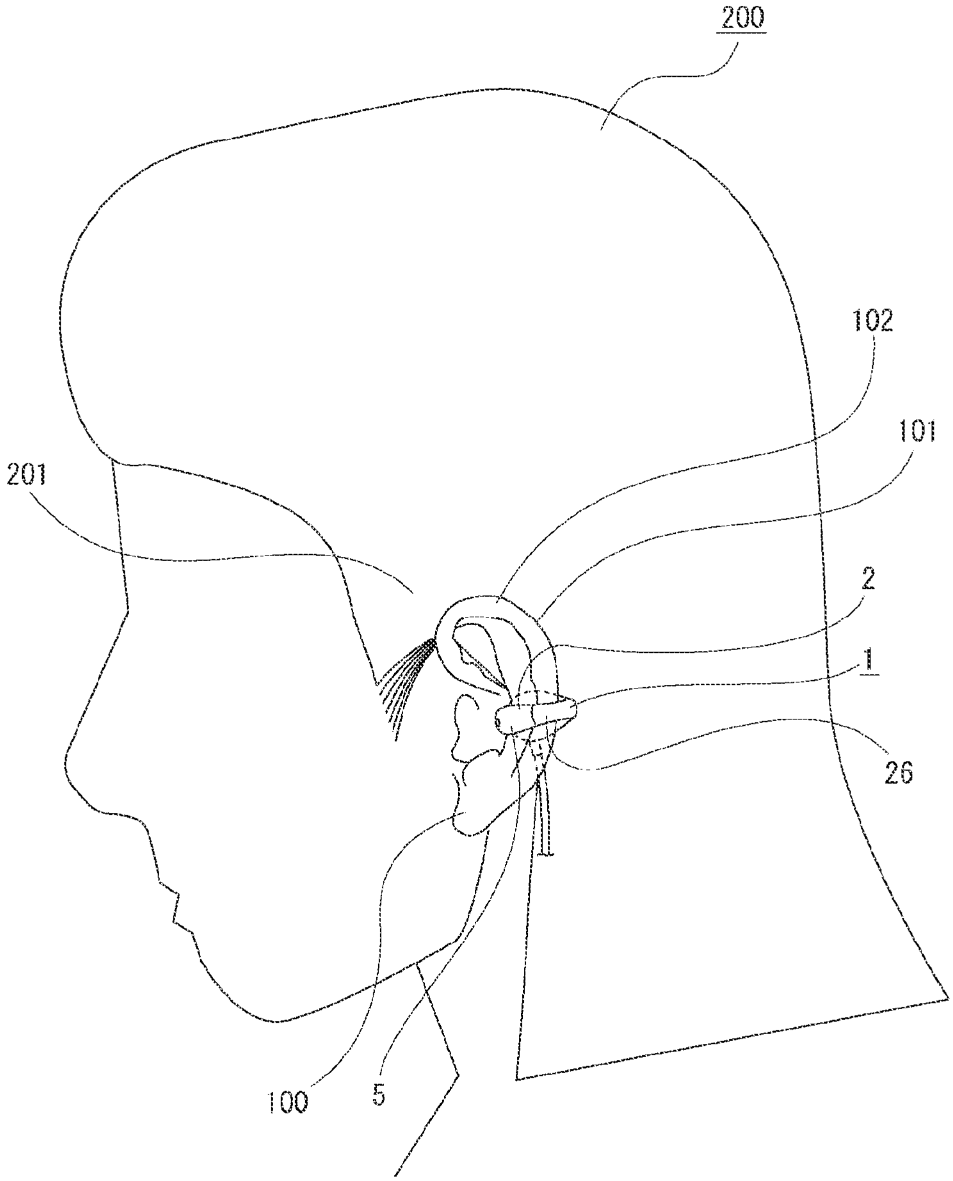
FIG. 7 is a perspective view illustrating a state in which the sound output device is attached to the ear.
Figure 8:
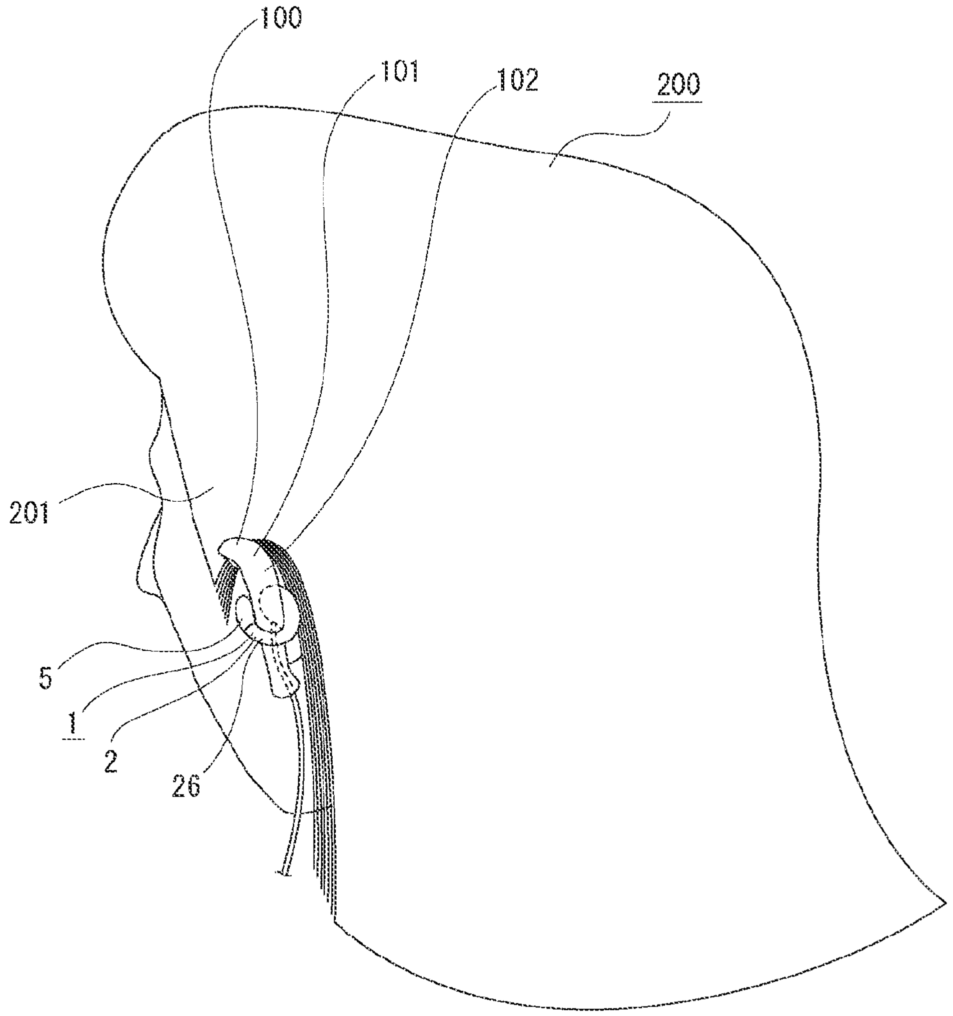
FIG. 8 is a perspective view illustrating a state in which the sound output device is attached to the ear when viewed from an angle different from that in FIG. 7.
Figure 9:
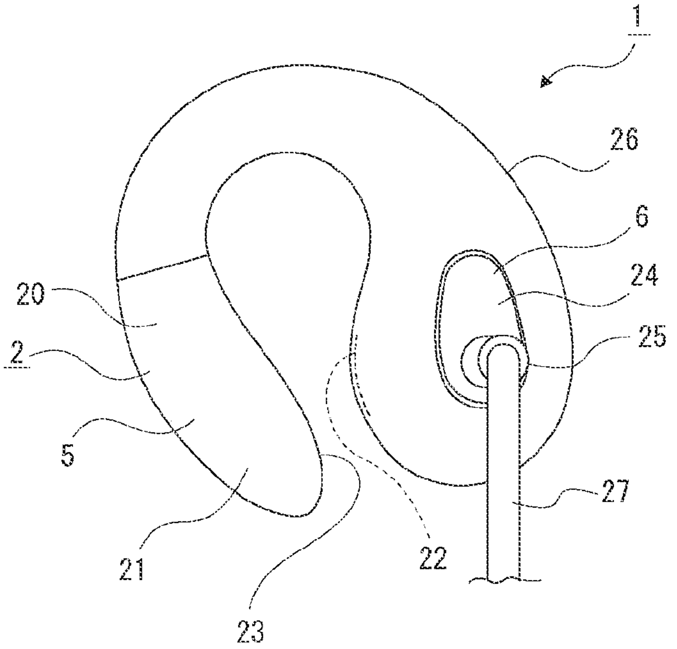
FIG. 9 is a side view illustrating a state before the sound output device is elastically deformed.

The sound output device 1 is attached to the ear 100 in a state in which a portion other than a part thereof is covered with the cover 26 and also in a state in which the attachment portions 2 sandwiches an outer peripheral portion of the auricle 101, for example, the helix 102 from the front side and the rear side (see FIGS. 7 and 8).

Figure 10:
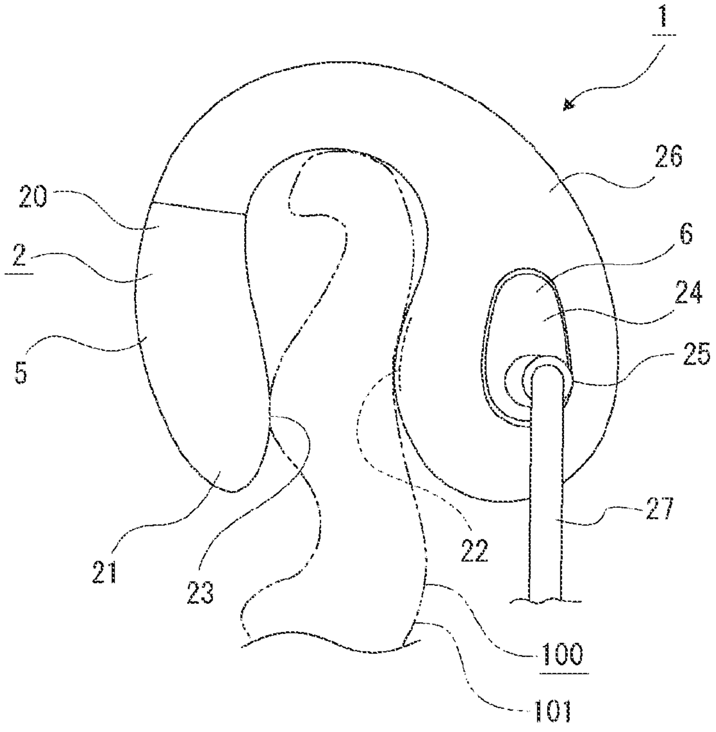
FIG. 10 is a side view illustrating a state in which the sound output device is attached.

When the sound output device 1 is attached to the ear 100, the helix 102 is relatively inserted between the first pressing portion 22 and the second pressing portion 23 in a state in which the first pressing portion 22 and the second pressing portion 23 are elastically deformed in a direction separated from each other (see FIG. 9), and in the state in which the helix 102 is inserted, the sound output device 1 is elastically returned and attached to the ear 100 (see FIG. 10). In the state in which the sound output device 1 is attached to the ear 100, the first pressing portion 22 and the second pressing portion 23 of the attachment portion 2 are brought into a state pf contacting and being pressed against both surfaces of the auricle 101 respectively.

Note that since the first pressing portion 22 is covered with the cover 26, the attachment portion 2 is brought into a state in which the first pressing portion 22 is pressed against the auricle 101 via the cover 26.

The first pressing portion 22 is brought into a state of contacting a rear surface of the auricle 101, and the second pressing portion 23 is brought into a state of contacting a front surface of the auricle 101. Therefore, the speaker 3 arranged in the speaker arrangement portion 7 is positioned on the rear side of the auricle 101.

At this time, since the surface of each of the first pressing portion 22 and the second pressing portion 23 is formed in the curved surface projecting outward, the sound output device 1 is attached to the ear 100 in a state in which the curved surfaces thereof are pressed. Therefore, an excessive load is not applied to the auricle 101 from the sound output device 1 and an excellent attachment state of the sound output device 1 to the ear 100 can be secured.

Note that the example in which the surface of each of the first pressing portion 22 and the second pressing portion 23 is formed in the curved surface is described above, but at least the surface of any one of the first pressing portion 22 or the second pressing portion 23 may be formed in a flat surface.

The sound output device 1 is attached to the ear 100 as described above, and since a part of the sound output device 1 is not particularly needed to be hooked at a root portion of the auricle 101 that is a boundary between the temporal region 201 and the auricle 101 for attachment, hair does not interfere with the sound output device 1 in a case where a user is a woman or the like with long hair, and a stable attachment state can be secured regardless of a hair length of the user.

Additionally, even in a case where an accessory such as a pierced earring is attached to the ear 100, the sound output device 1 can be attached to a position other than an attachment portion of the accessory, for example, the earlobe 112, and the stable attachment state can be secured while the usability is also improved.

Note that the example in which the sound output device 1 is attached to the ear 100 in the state in which the respective portions of the attachment portion 2 sandwich the outer peripheral portion of the auricle 101 is described above, but the sound output device 1 may be attached to the ear 100 in a state in which the respective portions of the attachment portion 2 sandwich a portion other than the outer peripheral portion of the auricle 101.

On the other hand, the sound output device 1 can be detached from the ear 100 by elastically deforming the sound output device 1 in a direction in which the first pressing portion 22 and the second pressing portion 23 are separated from each other and further separating the sound output device 1 from the auricle 101.

As described above, the attachment portion 2 is formed in the bent shape in such a manner that the longitudinal direction becomes the peripheral direction, the gap A is formed between both ends in the longitudinal direction, and the attachment portion 2 is elastically deformable in the direction in which both end portions are separated from each other and contact each other.

Accordingly, since the attachment portion 2 is elastically deformed at the time of attachment to and detachment from the ear 100, the attachment to and detachment from the ear can be easily performed and also the stable attachment state to the ear can be secured.

Additionally, in the sound output device 1, since the first pressing portion 22 and the second pressing portion 23 are provided at both end portions of the attachment portion 2 respectively, both end portions of the attachment portion 2 are pressed against both surfaces of the auricle 101 respectively.

Therefore, the portions pressed against the auricle 101 are both end portions of the attachment portion 2, a length from the first pressing portion 22 to the second pressing portion 23 is an entire length of the sound output device 1, and the stable attachment state to the ear 100 can be secured while downsizing of the sound output device 1 is secured.

Furthermore, the portion other than both end portions in the attachment portion 2 is provided as the intermediate portion 9, and the distance A between the pair of ends in the longitudinal direction is formed shorter than the maximum distance H out of the distances each connecting two points in the inner periphery of the intermediate portion 9.

Therefore, the intermediate portion 9 hardly contacts the auricle 101 in the state in which the sound output device 1 is attached to the ear 100, and the sound output device 1 can be attached to the ear 100 without applying any load to the ear 100 from the intermediate portion 9.

Moreover, since the outer surface of the attachment portion 2 is formed in the curved surface, the sound output device 1 is attached to the ear 100 in the state in which the curved surface is pressed. Therefore, the excellent attachment state to the ear 100 can be secured.

As described above, in the state in which the sound output device 1 is attached to the ear 100, the detachable body 5 is positioned in the internal space 150 of the auricle 101 in a state in which the distal end portion does not contact the auricle 101. The detachable body 5 is brought into a state in which the entire external acoustic aperture 113*a* is not closed, and the opening 19*a* is positioned in the vicinity of the external acoustic aperture 113*a*.

Thus, in the state in which the sound output device 1 is attached to the ear 100, since the opening 19*a* of the attachment portion 2 is positioned in the internal space 150 of the auricle 101, the opening 19*a* is positioned close to the external auditory meatus 113, and it is possible to secure excellent recognizability for an external sound and the sound output from the speaker 3.

Additionally, since a portion including the opening 19*a* of the attachment portion 2 is in a non-contacting state with the ear 100 in the state in which the sound output device 1 is attached to the ear 100, the portion including the opening 19*a* from which the sound is emitted becomes a state of not contacting the ear 100.

Therefore, it is possible to not only secure the excellent recognizability for the external sound and the sound output from the sound output device 1 but also suppress a sense of discomfort caused during the attachment state to the ear 100.

Furthermore, since the opening 19*a* is positioned in the vicinity of the external acoustic aperture 113*a* in the state in which the sound output device 1 is attached to the ear 100, a sound guided by the attachment portion 2 is emitted to the external auditory meatus 113 from the opening 19*a*, and the sound can be heard excellently.

Note that in the state in which the sound output device 1 is attached to the ear 100, the opening 19*a* of the attachment portion 2 may also be positioned in the cavum conchae 114.

In this case also, since the opening 19*a* of the attachment portion 2 is positioned close to the external auditory meatus 113, excellent recognizability for the external sound and the sound output from the speaker 3 can be secured.

Additionally, the opening 19*a* of the detachable body 5 may not be necessarily positioned at the external auditory meatus 113 or the cavum conchae 114, and as far as the opening 19*a* is positioned inside the internal space 150 of the auricle 101, the opening 19*a* may be positioned distant from the external auditory meatus 113 and the cavum conchae 114.

Note that, depending on a shape and a size of the ear 100 of the user, the opening 19*a* of the detachable body 5 may be positioned outside the internal space 150 of the auricle 101.

Additionally, since a structure such as the speaker 3 arranged inside the attachment portion 2 does not exist on the front side of the auricle 101 in the state in which the sound output device 1 is attached to the ear 100, the structure existing on the front side of the auricle 101 is small, and it is possible to suppress influence on a head-related transfer function and suppress degradation in spatial perceptual capability.

Furthermore, the detachable body 5 including the opening 19*a* is detachably attached to the coupling portion 14 of the housing 4. Therefore, the detachable body 5 can be replaced in accordance with the size, the shape, and the like of the ear 100, and an excellent sound hearing state can be secured regardless of the size, the shape, and the like of the ear 100.

For example, in the state in which the sound output device 1 is attached to the ear 100, the opening 19*a* can be positioned at a desired position by replacing the detachable body 5 with the one having a different length, and the usability of the sound output device 1 can be improved.

Furthermore, since the sound output device 1 is provided with the coupling portion 14 to be inserted into the detachable body 5 at the time of coupling the detachable body 5, the detachable body 5 is coupled to the coupling portion 14 by the coupling portion 14 being inserted into the detachable body 5, and the coupling work of the detachable body 5 to the coupling portion 14 can be quickly and easily performed.

Moreover, since the cover 26 is mounted on the attachment portion 2, a gap between the cover 26 and the second pressing portion 23 becomes smaller than the gap A because of the thickness of the cover 26, the auricle 101 can be sandwiched by the first pressing portion 22 and the second pressing portion 23 with a sufficient pressure in the state in which the sound output device 1 is attached, and the stable attachment state of the sound output device 1 to the ear 100 can be secured.

Additionally, the outer fitting portion 20*a* of the detachable body 5 to be externally fitted with the coupling portion 14 includes a material having the hardness higher than that of the remaining part of the detachable body 5. Therefore, when the sound output device 1 is elastically deformed or elastically returned at the time of attachment to and detachment from the ear 100, it is possible to prevent the detachable body 5 from falling from the housing 4 because the coupled portion 20 of the detachable body 5 is not easily deformed with respect to the coupling portion 14.

Furthermore, since the outer fitting portion 20*a* includes the material having the hardness higher than that of the remaining part of the detachable body 5, the coupled portion

20 is hardly deformed and it is possible to prevent the detachable body 5 from being turned up from the housing 4.

Note that the detachable body 5 may include a material (flexible material) that can be deformed (bent) and held in a deformed state. Since the detachable body 5 includes such a material, the detachable body 5 is deformed into a desired state in the state in which the sound output device 1 is attached to the ear 100, and for example, the opening 19*a* can be moved close to the external auditory meatus 113 or a direction of the sound emitted from the opening 19*a* can be changed as necessary.

Additionally, both the coupling portion 14 and the detachable body 5 may include the material that can be deformed (bent) and held in the deformed state. Since the coupling portion 14 and the detachable body 5 include such a material, the attachment portion 2 can be deformed into a desired state in the state in which the sound output device 1 is attached to the ear 100, and for example, the opening 19*a* can be moved close to the external auditory meatus 113 or the direction of the sound emitted from the opening 19*a* can be changed as necessary.

Furthermore, since the attachment portion 2 can be deformed in accordance with the shape and the size of the ear 100 at the time of attaching the attachment portion 2 to the ear 100, the stable attachment state of the sound output device 1 to the ear 100 can be secured.

Moreover, in a case of using a pair of the sound output devices 1 and 1, the sound output devices 1 and 1 function as stereo, functionality of the sound output devices 1 and 1 is improved, and high-quality sound hearing can be achieved. Additionally, an excellent balance in weight can be secured for the left and right ears 100 and 100, and the sound output devices 1 and 1 can be attached to the left and right ears 100 and 100 in the stable state.

Note that the example in which the speaker 3 is arranged in the speaker arrangement portion 7 provided at the one end portion in the longitudinal direction of the attachment portion 2 is described above, but the speaker 3 may also be arranged at the other end portion or a position close to the other end portion in the longitudinal direction of the attachment portion 2.

<Engaged State of Sound Output Devices and Others>

An engaged state of the sound output devices 1 and 1 and others will be described below (see FIGS. 11 and 12).

Figure 11:
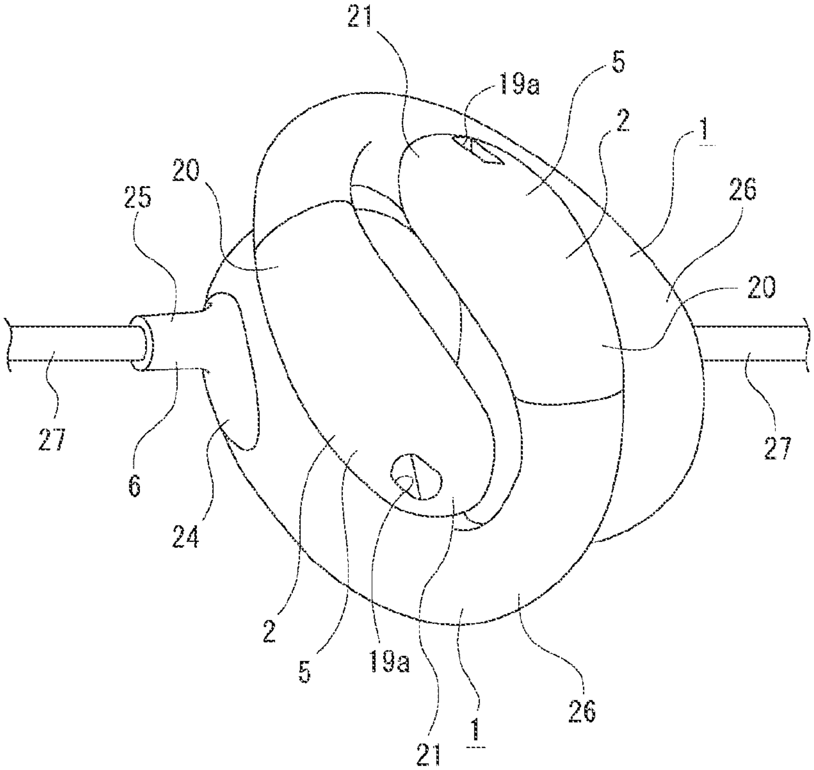
FIG. 11 is a perspective view illustrating a state in which the sound output devices are engaged with each other.

The sound output devices 1 and 1 can be held in a state of being engaged with each other (see FIG. 11).

The sound output devices 1 and 1 can be engaged with each other by: setting a positional relation between the speaker arrangement portions 7 and 7 and the sound output units 8 and 8 to be orthogonal to each other in a state in which the sound output devices face each other; and moving at least one side thereof close to the other side. When the sound output devices 1 and 1 are engaged with each other, the speaker arrangement portion 7 and the sound output unit 8 are inserted into between the speaker arrangement portion 7 and the sound output unit 8 in the sound output devices 1 and 1.

At this time, in the sound output device 1 and 1, the speaker arrangement portions 7 and 7 and the sound output units 8 and 8 are elastically deformed in a direction separated from each other, and the speaker arrangement portions 7 and 7 and the sound output units 8 and 8 are elastically returned by mutually getting over the speaker arrangement portions 7 and 7 and the sound output units 8 and 8. When the speaker arrangement portion 7 and the sound output unit 8 are inserted into between the speaker arrangement portion 7 and the sound output unit 8 each other, the mutual outer surfaces (the outer surface of the attachment portion 2 and the outer surface of the cover 26) of the attachment portions 2 and 2 slide and contact each other, but since the outer surfaces of the attachment portions 2 and 2 are formed in the curved surfaces projecting outward in the sound output devices 1 and 1, the speaker arrangement portion 7 and the sound output units 8 can be smoothly inserted to each other.

In a state in which the sound output devices 1 and 1 are engaged with each other, the speaker arrangement portions 7 and 7 and the sound output units 8 and 8 are positioned on the inner side of the intermediate portions 9 and 9, and the sound output devices 1 and 1 are brought into a state of being hardly separated.

On the other hand, engagement between the sound output devices 1 and 1 can be disengaged by moving both of the sound output devices in the direction separated from each other for elastic deformation, and then elastically returning the sound output devices.

Thus, in the sound output devices 1, since the attachment portions 2 and 2 can be engaged with each other, when not in use, the sound output devices can be carried around or stored in the state in which a pair of the attachment portions 2 and 2 are engaged with each other, and entanglement between the cords 27 and between the cords 27 and the attachment portions 2 and 2 which are the portions to be attached the ears can be prevented while carrying around and storing the sound output devices, and the usability can be improved.

Additionally, in the attachment portion 2, a maximum thickness of the speaker arrangement portion 7 that is the one end portion in the longitudinal direction and a maximum thickness of the sound output unit 8 that is the other end portion in the longitudinal direction are thicker than a maximum thickness of the intermediate portion 9.

Therefore, in the engaged state of the attachment portions 2 and 2, the speaker arrangement portions 7 and 7 and the sound output units 8 and 8 which are both end portions can be positioned in a state of being inserted to the inner sides of the intermediate portions 9 and 9, the engaged state can be hardly separated from each other, and the attachment portions 2 and 2 can be engaged with each other in a stable state.

Figure 12:
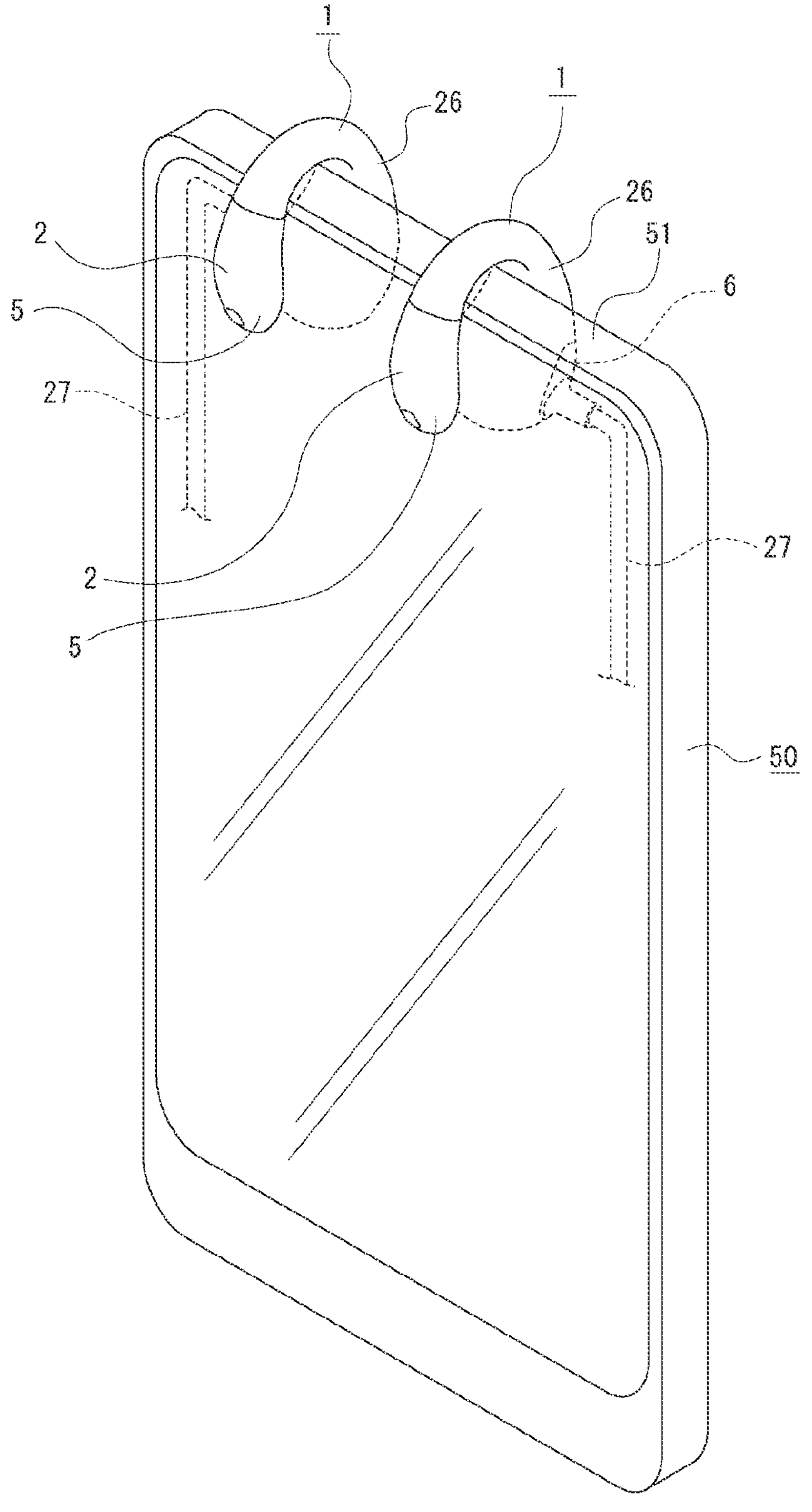
FIG. 12 is a perspective view illustrating a state in which the sound output devices are mounted on an electronic apparatus.

On the other hand, besides engagement with each other, the sound output devices 1 and 1 can also be stored and the like by being mounted on another structure, another apparatus, or the like (see FIG. 12).

For example, in a case of using the sound output device 1 in an electronic apparatus 50 such as a mobile phone, or the like, an outer peripheral portion 51 of the electronic apparatus 50 is inserted into between the speaker arrangement portion 7 and the sound output unit 8, and the sound output device 1 is stored and the like by being mounted on the electronic apparatus 50 in a state in which the outer peripheral portion 51 is held by the speaker arrangement portion 7 and the sound output unit 8 from both surface sides. In the state in which the outer peripheral portion 51 is held by the speaker arrangement portion 7 and the sound output unit 8 from both surface sides, bias force is applied to the sound output device 1 by elastic force in a direction in which the speaker arrangement portion 7 and the sound output unit 8 come close to each other, and the sound output device 1 is brought into a state of hardly falling from the electronic apparatus 50 by vibration or the like.

Such use (storage) can also be performed at the time of, for example, temporarily stopping listening to music and detaching the sound output device 1 from the ear 100.

As described above, since the sound output device 1 can be mounted on the outer peripheral portion 51 while holding the outer peripheral portion 51 of the electronic apparatus 50 such as a mobile phone, the sound output devices can be easily carried around, store, and the like, and the usability can be improved.

Additionally, entanglement between the cords 27 and between the cord 27 and the attachment portion 2 which is the portion to be attached to the ear 100 can be prevented at the time of carrying around and storing the sound output devices, and the usability can be improved.

Other Examples

Note that, in the sound output devices 1 and 1, the sound output device 1 for the left ear 100 and the sound output device 1 for the right ear 100 may have similar internal configurations, and also the sound output device 1 for the left ear 100 and the sound output device 1 for the right ear 100 may have different internal configurations.

For example, the speaker 3, a battery (not illustrated), and a relay board (not illustrated) may be arranged inside the attachment portion 2 of one sound output device 1, and the speaker 3 and a control board (not illustrate) may be arranged inside the attachment portion 2 of the other sound output device 1.

The relay board of the one sound output devices 1 and the control board of the other sound output device 1 are connected by a cord 27. Power of the battery is supplied to the speaker 3 and the relay board of the one sound output device 1 and then also supplied from the relay board to the control board and the speaker 3 of the other sound output device 1 via the cord 27. Additionally, a sound signal received by wireless communication of a communication circuit on the control board is transmitted to the speaker 3 of the one sound output devices 1 and further transmitted to the speaker 3 of the other sound output device 1 via the cord 27 and the relay board. The received sound signal is converted into a sound and output from each of the speakers 3 and 3.

As described above, since the configuration in which the sound signals are received through the wireless communication can be achieved in the sound output devices 1 and 1, convenience and usability can be improved.

Note that, in the sound output device 1, a sound signal from an external apparatus such as a music player may be received through the wireless communication and the received sound signal may be converted and output as a sound from the speaker 3, or pairing processing such as connection authentication with the music player may also be achieved. The wireless communication to receive a sound signal may conform to, for example, Bluetooth (registered trademark), wireless fidelity (WiFi), or near field communication such as NFC as wireless communication for the pairing processing like the connection authentication.

Additionally, in the sound output devices 1 and 1, since the battery is arranged only in the one sound output device 1, weight reduction can be achieved in the sound output devices 1 and 1 as a whole, and an internal structure can be simplified.

Furthermore, in the sound output device 1, since the weight reduction is achieved as described above, an excessive load is not applied to the ear 100 in the state of being is attached to the ear 100, and the excellent attachment state without any sense of discomfort in the ear 100 can be secured.

Note that the battery arranged inside the attachment portion 2 may be either a disposable type or a rechargeable type. Particularly, in a case where the battery is the disposable type, it is preferable that a part of the attachment portion 2 be openable such that battery change can be performed. Additionally, in a case where the battery is the rechargeable type also, a part of the attachment portion 2 may be openable such that battery change can be performed.

<Present Technology>

The present technology may adopt the following configurations.

(1)

A sound output device including an attachment portion which includes a first pressing portion and a second pressing portion to be pressed against both surfaces of an auricle respectively and is attached to an ear in a state of sandwiching the auricle, in which a pair of the attachment portions is provided, and the pair of attachment portions can be engaged with each other.

(2)

The sound output device recited in (1) above, in which the attachment portion is formed in a bent shape in such a manner that a longitudinal direction becomes a peripheral direction, a gap is formed between both of end portions in the longitudinal direction, and the attachment portion is elastically deformable in directions in which both of the end portions in the longitudinal direction are separated from each other and contact each other.

(3)

The sound output device recited in (2) above, in which the first pressing portion and the second pressing portion are provided at both of the end portions of the attachment portion, respectively.

(4)

The sound output device recited in (2) or (3) above, in which a portion other than both of the end portions of the attachment portion is provided as an intermediate portion, and a distance between a pair of ends in the longitudinal direction is formed shorter than a maximum distance out of distances each connecting two points in an inner periphery of the intermediate portion.

(5)

The sound output device recited in any one of (1) to (4) above, in which a surface of each of the first pressing portion and the second pressing portion is formed in a curved surface projecting outward.

(6)

The sound output device recited in any one of (2) to (5) above, in which a portion other than both of the end portions in the attachment portion is provided as the intermediate portion, and a maximum thickness of one end portion in the longitudinal direction and a maximum thickness of the other end portion in the longitudinal direction are formed thicker than a maximum thickness of the intermediate portion.

(7)

The sound output device recited in any one of (1) to (6) above, in which the attachment portion is formed by connecting a plurality of members, and the attachment portion has an outer surface closely covered with a cover.

(8)

The sound output device recited in any one of (1) to (7) above, in which the outer surface of the attachment portion is formed in a curved surface.

REFERENCE SIGNS LIST

100 Ear
101 Auricle
1 Sound output device
2 Attachment portion
3 Speaker
4 Housing
9 Intermediate portion
22 First pressing portion
23 Second pressing portion
26 Cover

What is claimed is:

1. An audio device attached to an ear, comprising:

an attachment portion that has a first pressing portion and a second pressing portion, wherein the first pressing portion and the second pressing portion are each formed at an end portion of the attachment portion, wherein the first pressing portion and the second pressing portion face each other, wherein the attachment portion has a space for relative insertion of the ear between the first pressing portion and the second pressing portion, wherein a gap between the first pressing portion and the second pressing portion is narrower than an inner width of the space, wherein the first pressing portion and the second pressing portion of the attachment portion are brought into a state of contacting and being pressed against both surfaces of the ear respectively, wherein the audio device is brought into a state in which an external acoustic aperture is not closed, and wherein a sound guiding space formed inside the attachment portion guides sound output from a speaker in the first pressing portion to a sound hole in the second pressing portion.

2. The audio device according to claim 1, further comprising:

an opening, wherein sound is emitted from the opening in a state of not contacting the ear.

3. The audio device according to claim 1, wherein the first pressing portion and the second pressing portion are configured to be pressed against both surfaces of an auricle of a user.

4. The audio device according to claim 1, wherein an opening that emits sound is provided on the second pressing portion.

5. The audio device according to claim 1, wherein the attachment portion includes an intermediate portion between the first pressing portion and the second pressing portion.

6. The audio device according to claim 5, wherein a maximum thickness of the first pressing portion and the second pressing portion in a longitudinal direction is thicker than a maximum thickness of the intermediate portion in the longitudinal direction.

7. The audio device according to claim 6, wherein the intermediate portion hardly contacts the ear of a user in a state in which the audio device is attached to the ear.

8. The audio device according to claim 1, wherein an outer surface of the attachment portion is a curved surface.

9. The audio device according to claim 1, wherein a length from the first pressing portion to the second pressing portion is an entire length of the audio device.

10. The audio device according to claim 1, wherein a surface of each of the first pressing portion and the second pressing portion in contact with the ear is formed in a curved surface projecting outward.

* * * * *